United States Patent

[11] 3,557,382

| | | |
|---|---|---|
| [72] | Inventor | Peter Kotos<br>Havertown, Pa. |
| [21] | Appl. No. | 786,079 |
| [22] | Filed | Dec. 23, 1968 |
| [45] | Patented | Jan. 19, 1971 |
| [73] | Assignee | General Electric Company<br>a corporation of New York |

[54] CONTROL AT SUBSTANTIALLY LINE POTENTIAL FOR A HIGH VOLTAGE D-C CIRCUIT BREAKER
4 Claims, 3 Drawing Figs.

[52] U.S. Cl. .................................................. 307/139,
321/10
[51] Int. Cl. .................................................. H01h 9/54
[50] Field of Search .................................. 323/62;
321/9, 10; 317/33SCR, 59; 307/112, 134, 139,
140, 143, 151

[56] References Cited
UNITED STATES PATENTS
2,745,952  5/1956  Cabanes et al. .............. 307/143X
3,229,184  1/1966  Churchill .................... 321/10

Primary Examiner—Robert K. Schaefer
Assistant Examiner—H. J. Hohauser
Attorneys—J. Wesley Haubner, William Freedman, Frank L. Neuhauser, Oscar B. Waddell and Melvin M. Goldenberg ABSTRACT: Discloses a high-voltage, direct-current circuit breaker having a control circuit at substantially line potential. Operating power for the control circuit is derived directly from the high voltage DC line by utilizing the small ripple component in the direct current in the line to produce a changing flux in a magnetizable core mounted about the line. The core has a low permeability gap therein that is of sufficient size to maintain the core unsaturated at rated current through the DC line.

PATENTED JAN 19 1971

3,557,382

INVENTOR:
PETER KOTOS,

BY William Freedman
ATTORNEY 3,557,382

1

CONTROL AT SUBSTANTIALLY LINE POTENTIAL FOR A HIGH VOLTAGE D-C CIRCUIT BREAKER

This invention relates to a circuit breaker for a high-voltage direct-current line and, more particularly, relates to a control for such a circuit breaker which is at substantially line potential.

For supplying power to such a control, it is customary to rely upon a power source at ground potential and suitable insulating means through which power can be transmitted from the source at ground potential to the control at high potential. This insulating means may assume various forms, e.g., a mechanical coupling of insulating material or a control power transformer having its input and output windings separated by suitable high-voltage insulation. But there are some serious disadvantages associated with such insulating means. For example, a mechanical coupling of insulating material is usually quite massive due to the great lengths necessitated by the high voltage involved, and both the mass and length detract from the high-speed response usually desired. A control power transformer with full high-voltage insulation is disadvantageous because of its relatively high cost.

An object of my invention is to provide simple and inexpensive means for deriving the power for the high potential control from the high-voltage DC circuit itself.

Another object is to provide power supply means for the high potential control which requires no extensive high-voltage insulation through, or across which, control power must be transmitted.

In carrying out my invention in one form, I provide the circuit breaker with a control circuit that is at substantially line potential. I derive operating power for the control circuit directly from the high-voltage DC line through a core device that comprises a core of magnetizable material mounted about the line. The core contains a low permeability gap therein that is of sufficient size to maintain the core unsaturated at rated current through the DC line. By keeping the core unsaturated at rated current, I am able to rely upon the small ripple component present in the direct current in the line to produce a changing flux in the core. A secondary winding linked to the core, and also at substantially line potential, responds to this changing flux by producing a control voltage which is applied to the control circuit. Thus, the small ripple component of the direct current in the high-voltage line is used for developing the desired power for the line potential control circuit.

For a better understanding of the invention, reference may be had to the following description taken in conjunction with the accompanying drawing, wherein.

Figure 1:
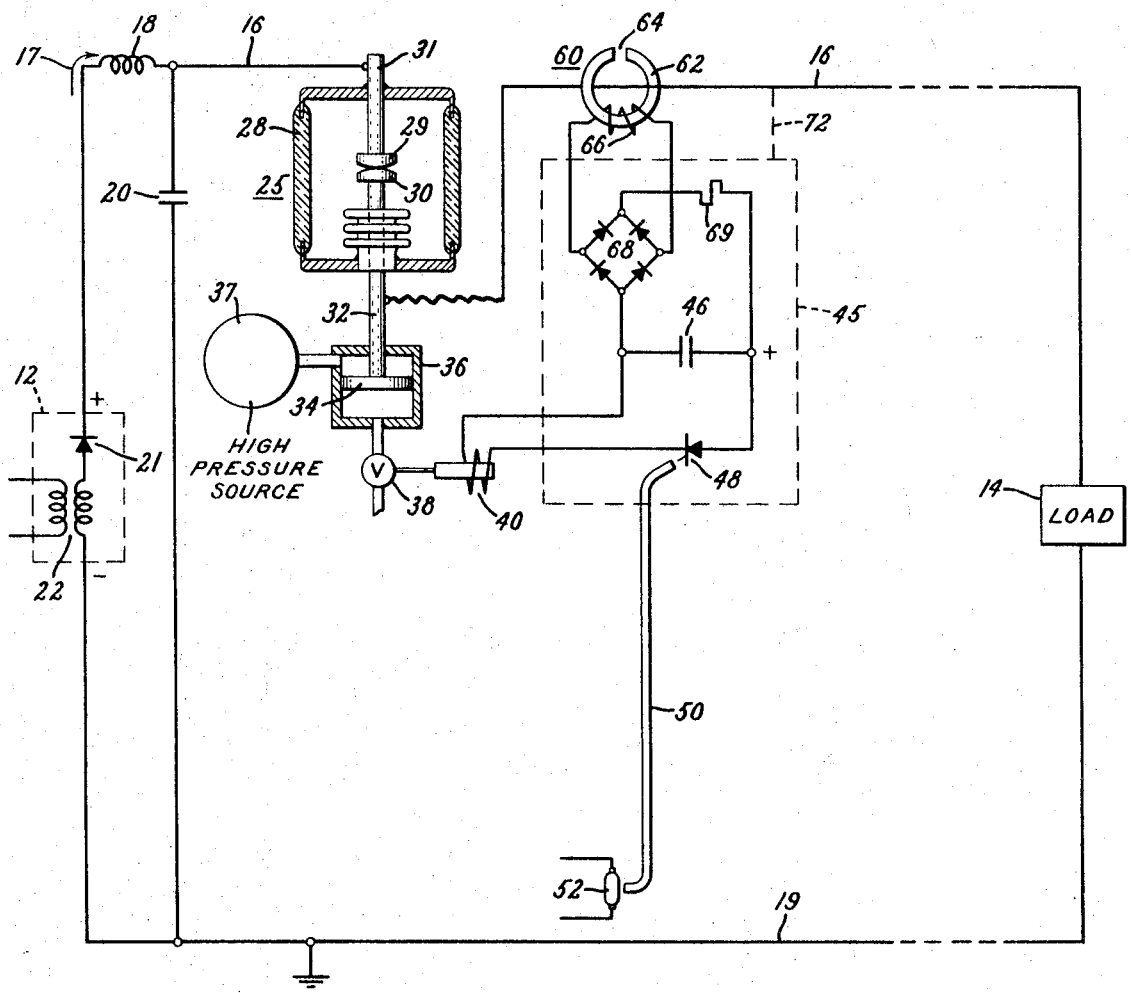
FIG. 1 is a schematic showing of a high voltage DC system embodying one form of my invention.

Referring now to FIG. 1, there is schematically shown a high-voltage DC system comprising a source 12, a load 14, and terminal conductors 16 and 19 connecting the load across the terminals of the source. It will be assumed that normal load current flows in the direction indicated by arrow 17, flowing to the load through high-voltage line 16 and returning to the source through grounded return conductor 19. In referring herein to a high-voltage DC system, it is intended to denote systems having a voltage rating of at least 50 kv.

The source 12 is schematically depicted as comprising a transformer 22 and a rectifier 21 connected in series with the secondary winding of the transformer. Connected in the high-voltage line 16 and in series with the source 12 and load 14 is the usual smoothing reactor 18 which helps to smooth the current output from the source. Connected across the terminal conductors 16 and 19 adjacent the source is a large capacitor 20 which cooperates with the smoothing reactor 18 to further aid in smoothing the current output from the source. The capacitor 20 and the smoothing reactor 18 are conventional parts of most high-voltage DC systems.

2

Figure 2:
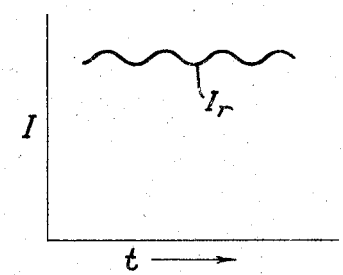
FIG. 2 is a graphic representation of the current in the DC line of FIG. 1.

Although the source 12 has been shown in the most simple schematic form, it is to be understood that it will typically be much more sophisticated and complex. Typical sources are illustrated, for example, in chapter 2 of the book by Adamson and Hingorani entitled "High Voltage Direct Current Power Transmission" published in 1960 by Garraway Ltd., London, England. These DC power sources are capable of producing DC current which has only a small ripple component. But even when smoothing elements such as 18 and 20 are present, this ripple component still exists and the current form would typically be such as depicted at $I_r$ in FIG. 2. Usually this ripple component will be on the order of 5 to 10 percent of the rated current of the line and will have a frequency of 360 or 720 Hz., depending upon the nature of the source. By way of example and not limitation, a typical rated current for such a system would be 2,000 a.

For controlling the flow of current through load 14, a circuit breaker 25 is connected in the line conductor 16 in series with load 14 and smoothing reactor 18. This circuit breaker 25 is shown in schematic form only since most of its details are not a part of the invention. For a more detailed disclosure of such a circuit breaker, reference may be had to U.S. Pat. No. 3,390,305-Greenwood, assigned to the assignee of the present invention.

The illustrated circuit breaker comprises a vacuum-type circuit interrupter comprising a highly evacuated housing 28 and a pair of separable contacts 29 and 30 located therein. Contact 29 is a stationary contact, and contact 30 is a movable contact that engages the stationary contact when the circuit breaker is closed as shown. The contacts are mounted on conductive rods 31 and 32, which serve as terminals for the interrupter. Thus, when the contacts are engaged as shown, current passes through the interrupter via a path extending through parts 31, 29, 30, 32.

Connected to movable contact 30 through short operating rod 32 is a piston 34 which is reciprocally mounted in a cylinder 36. When the breaker is in the position shown in FIG. 1, high-pressure fluid is present within cylinder 36 on both sides of the piston. Since the effective area of the lower side of the piston is greater than that of the upper side (because of the presence of the operating rod 32), the pressurized fluid acting on the lower side urges the piston upwardly to hold the contacts in engagement. As shown in FIG. 1, a high-pressure source 37 is connected directly with the space at the upper side of the piston to maintain high-pressure fluid in this space.

The circuit breaker is opened by venting the space beneath the piston to allow the pressurized fluid thereabove to drive the piston in a downward opening direction, thus driving movable contact 30 out of engagement with stationary contact 29. For venting the space beneath piston, a suitable normally closed valve 38 controlled by a solenoid 40 is provided. When solenoid 40 is operated, valve 38 is opened to vent the space beneath the piston, and the piston responds by moving rapidly downward. The valve 38 is a conventional high-speed valve comprising a main valve assembly and a sensitive pilot valve assembly, the pilot valve assembly being operable by the solenoid 40 to initiate opening of the main valve assembly. Since valves of this type are conventional, the valve 38 has been shown in schematic form only.

In certain DC circuit breakers it is important to separate the contacts of the breaker as rapidly as possible once an opening signal is received. To permit the desired extreme high-speed opening, the piston 34, cylinder 36, valve 38, and solenoid 40 are located closely adjacent the circuit interrupter 25 and are at substantially line potential. Locating the cylinder and piston near the interrupter minimizes the length and mass of operating rod 32, and locating the valve 38 near the cylinder minimizes the amount of fluid which needs to be vented from beneath the piston 34 to initiate opening. Both of these factors contribute to higher speed opening of the circuit breaker. If the cylinder and piston had been at ground potential instead of line potential, an operating rod 32 of great length would have been required to withstand the high line-to-ground voltages, and this length and the resulting mass would considerably reduce my capability for high opening speeds.

For supplying operating energy to the solenoid 40, a control, generally indicated at 45, is provided. In the schematic illustration of FIG. 1, this control 45 comprises a capacitor 46 across which is connected the series combination of the coil of solenoid 40 and a normally off switching device 48. When switching device 48 is turned on the capacitor discharges through the solenoid coil to open valve 38, thereby initiating a circuit breaker opening operation.

The switching device 48 is shown as a light-activated silicon-controlled rectifier (SCR). This is a normally nonconducting device which can be triggered into conduction by a light signal applied thereto, conduction starting when the effective irradiance of the light signal exceeds a predetermined threshold value. The light activated SCR is a conventional device, and if a more detailed explanation thereof is desired, reference may be had to pages 205—217 of the Silicon Controlled Rectifier Manual, third edition, published in 1964 by General Electric Company. For supplying a light signal to the light-activated SCR 48, a light pipe 50 preferably of fiber optics is cone connected between the SCR 48 and a normally off light source 52 at ground potential. When the light source 52 is turned on, it emits a pulse of light that is transmitted through the light pipe to the SCR 48, abruptly turning on the SCR. The capacitor responds to this turn-on by rapidly discharging through the SCR and the solenoid coil 40 to quickly operate the solenoid.

Although in the illustrated embodiment, the trip initiating signal for the circuit breaker must be transmitted over the relatively great distance present between ground and the high-voltage line, it is capable of traversing this distance without significant time delay since it travels at the speed of light. The light source 52 is preferably a device, such as a xenon gaslamp, capable of emitting a pulse of light with a steep rate of rise of luminous intensity so that there is no significant delay in turning on the SCR after the pulse arrives at the SCR. Since the light pipe is a long member of electrical insulating material, it is capable of easily withstanding the high line-to-ground voltage present between its ends.

For charging the capacitor 46, I provide a current-transforming device 60 which is capable of utilizing the small ripple component of the direct current normally flowing through the high-voltage line 16. This device 60 comprises a core 62 of magnetizable material mounted about the line 16 and including an airgap 64. Linked to the core 62 is a secondary winding 66 which has its output terminals connected across a conventional rectifier bridge 68. The output terminals of the rectifier bridge 68 are connected across capacitor 46 through a suitable charging resistor 69.

Figure 3:
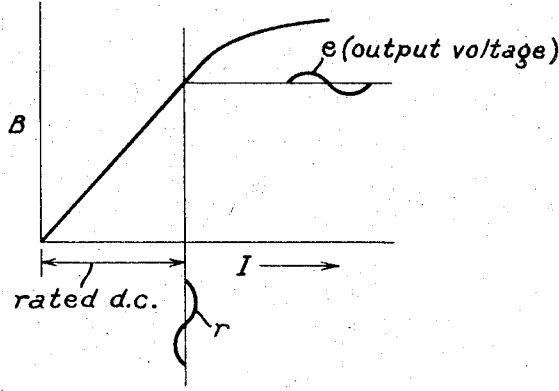
FIG. 3 is a graphic representation of certain other electrical relationships present in the system of FIG. 1.

The operating characteristics of the airgap core device 60 are illustrated in FIG. 3, where the flux density B in the core 62 is plotted against current I through high-voltage line 16. The constant value component of the direct current through the line 16, of course, induces no voltage in the secondary winding 66, simply providing a steady value of flux in the core 62 which drives it toward saturation. The airgap 64 is of such a size, however, that rated direct current through the line does not produce enough flux in the core to produce saturation. The ripple component of the direct current, depicted at r in FIG. 3, produces a constantly changing flux in the core which induces across the secondary winding 66 a proportional voltage indicated at e in FIG. 3. It is possible for the ripple component r to induce this voltage e because the core 62 is prevented by the airgap 64 from being saturated by rated direct current through line 16.

The secondary current produced by the output voltage e is rectified by rectifier bridge 68 and is supplied to the capacitor 46 through charging resistor 69. Thus, the capacitor 46 is maintained charged during normal conditions when rated current is flowing through line 16 and is therefore in readiness to provide energy for tripping the circuit breaker whenever called upon to do so.

As explained above, I have relied upon the small ripple component of the direct current in line 16 to provide the trip-initiating energy for the circuit breaker. Heretofore, those seeking a source of control power near the high voltage DC line have generally ignored this ripple component and have instead resorted to expensive, massive, or cumbersome arrangements for supplying the required energy to the high potential control. By utilizing the ripple component as above described, I am able to eliminate the need for such disadvantageous arrangements.

It will be apparent that my core device 60 requires no high voltage insulation between its secondary winding 66 and its primary conductor 16 since the secondary winding is at substantially the same potential as the primary conductor. This is in distinct contrast to those arrangements in which a line-to-ground insulated transformer is used to convey control power from ground to a control at line potential.

Although not shown in the schematic drawing of FIG. 1, there is a long, vertical column of insulating material atop which the circuit interrupter 25, its operator 34—40 and the control 45 are mounted. This long, insulating column serves to support these high potential parts and to isolate them from ground. The control 45 is at line potential, as indicated by the dotted line connection 72.

While the present invention has its primary application in the control of high-speed, high-voltage DC circuit breakers, the invention in its broader aspects has application to other forms of high-voltage DC apparatus utilizing a control at substantially line potential.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

I claim:

1. In combination with a high-voltage DC line having a voltage rating of at least 50 kv. and normally carrying a rated value or less of direct current containing a minor ripple component, a normally closed circuit breaker for interrupting current through said line and comprising a control circuit at substantially line potential for initiating opening of the circuit breaker, said control circuit comprising an electric energy storage device dischargeable to initiate an opening operation, and means for deriving from said line control power for charging said storage device comprising:
   a. a core of magnetizable material mounted about said line;
   b. said core containing a low permeability gap therein that is of sufficient size to maintain said core unsaturated at rated current through said line;
   c. a secondary winding at substantially line potential linked to said core for providing an output voltage across the winding terminals which varies with the ripple component of the DC current through said high-voltage line; and
   d. means for electrically connecting said terminals to said storage device for supplying charging current to said storage device dependent upon said output voltage.

2. The apparatus of claim 1 in which said circuit breaker comprises fluid-actuated opening means at substantially line potential and valve means at substantially line potential operable to initiate operation of said opening means, said control circuit supplying operating energy to said valve means upon receipt of a predetermined opening signal.

3. The apparatus of claim 2 in combination with means at a location of low potential compared to line potential for developing a light pulse as an opening signal, and light conveying means for transmitting said light pulse from the low potential location to said control circuit.

4. In combination with a high voltage DC line having a voltage rating of at least 50 kv. and normally carrying a rated value or less of direct current containing a minor ripple component, electrical apparatus connected in said line and having a control circuit at substantially line potential, said control circuit comprising an electric energy storage device dischargeable to initiate an operation of said apparatus, means for deriving from said line control power for charging said storage device comprising:

a. a core of magnetizable material mounted about said line;
  b. said core containing a low permeability gap therein that is of sufficient size to maintain said core unsaturated at rated current through said line;
  c. a secondary winding at substantially line potential linked to said core for providing an output voltage across the winding terminals which varies with the ripple component of the DC current through said high-voltage line; and
  d. means for electrically connecting said terminals to said storage device for supplying charging current to said storage device dependent upon said output voltage.